United States Patent [19]
Herrick

[11] 4,154,292
[45] May 15, 1979

[54] HEAT EXCHANGE METHOD AND DEVICE THEREFOR FOR THERMAL ENERGY STORAGE

[75] Inventor: Carlyle S. Herrick, Alplaus, N.Y.

[73] Assignee: General Electric Company, Schenectady, N.Y.

[21] Appl. No.: 868,532

[22] Filed: Jan. 11, 1978

Related U.S. Application Data

[63] Continuation-in-part of Ser. No. 706,875, Jul. 19, 1976, abandoned.

[51] Int. Cl.$^2$ ............................................. F28D 21/00
[52] U.S. Cl. ........................................... 165/1; 62/59; 126/400; 165/104 S; 237/1 A
[58] Field of Search ..................... 165/104 S; 126/400; 62/59, 345, 346; 237/1 A

[56] References Cited

U.S. PATENT DOCUMENTS

| | | | |
|---|---|---|---|
| 2,677,243 | 5/1954 | Telbes | 165/104 S X |
| 3,668,886 | 6/1972 | Hofer | 62/346 |

OTHER PUBLICATIONS

Hodgins et al., J. W. *The Storage and Transfer of Low Potential Heat*, Canadian Journal of Technology, vol. 33, p. 293, 1955.
Whillier, A. *Letter to the Editor*, The Sun at Work, vol. 2, p. 2, 6/1957.
Telbes, M. *Solar–Heat Storage*, ASME Paper 64 Wa–SOL-9, p. 4, 12/1964.

*Primary Examiner*—Albert W. Davis, Jr.
*Attorney, Agent, or Firm*—Leo I. MaLossi; Joseph T. Cohen; Charles T. Watts

[57] ABSTRACT

A heat exchange device for the introduction of thermal energy into and removal of thermal energy from liquid-solid phase change material is described in which the phase change material is maintained in a container, which is slowly rotated about a generally horizontal axis at a substantially constant rotational speed. Means are provided for automatically nucleating the phase change material as required for cyclic operation. The invention is of particular utility in the use of incongruently melting hydrates for the storage of thermal energy.

26 Claims, 11 Drawing Figures

HEAT EXCHANGE METHOD AND DEVICE THEREFOR FOR THERMAL ENERGY STORAGE

BACKGROUND OF THE INVENTION

This is a continuation-in-part of U.S. Pat. application Ser. No. 706,875 filed July 19, 1976, now abandoned, in the name of Carlyle S. Herrick.

The present invention is directed to the storage of thermal energy in liquid-solid phase change materials and improved devices and methods therefor.

The need for energy Storage is dictated by the fact that the demand for energy and the supply of energy both vary with time and generally this demand and supply are not synchronous. In the past centruy this lack of synchronization has been met by a reliance on fossil fuels. These fuels are becoming increasingly scarce and expensive and as a result, intensive effort is being directed toward the development of alternate primary energy sources, such as solar energy. The effective utilization of solar energy requires the development of new mechanisms and processes for energy storage, since solar energy is by nature only intermittently available.

Information on thermal energy storage as presently understood including historical aspects of some of the developments is set forth in the report "The Status of Thermal Energy Storage" by F. P. Bundy, C. S. Herrick, and P. G. Kosky (General Electric Technical Information Series Report 76CRDO41 April, 1976). The reviews therein of thermal energy storage (TES) include a discussion of the basic parameters in liquid sensible heat storage, solid sensible heat storage and phase change (liquid to solid) latent heat storage. Table II therein (page 78 et seq.) sets forth a listing of a large number of heat of fusion materials from which selections may be made for the practice of the instant invention. The Bundy et al. publication is incorporated by reference.

A study of the binary inorganic salt hydrates together with guidelines for the selection thereof for TES is set forth in the publication "Thermochemistry of Salt Hydrates" by G. Belton and F. Ajami (NTIS PB-227966 May 1973). This study is also incorporated by reference.

The problem of macro-segregation that is encountered in incongruently melting salt hydrates is referred to on page 56 of the Belton et al. report. An attempt was made to overcome this problem by J. W. Hodgins and T. W. Hoffman as described in their paper "The Storage and Transfer of Low Potential Heat", Canadian Journal of Technology 33, 293 (1955). The article is directly concerned with the use of Glauber's salt ($Na_2SO_4 \cdot 10H_2O$), which stores nearly five times as much heat as an equal volume of water in the 80°-100° F. range. In an attempt to overcome the problem encountered with the incongruent melting of Glauber's salt, the authors conducted experiments in which the heat transfer surface was moved relative to the crystal mass "in order to shed the crystal mantle which forms" (page 296). Thus, a rotating coil was disposed in the crystal mass (Glauber's salt to which a small amount of borax had been added as a nucleating agent) with water being carried by the rotating coil to remove the heat. The Glauber's salt was first melted by hot water passed through the coil and, subsequently, heat was withdrawn by passing cool water through the rotating coil. The inevitable conclusion to be reached from the Hodgins et al. teachings is that in a system in which thermal energy is to be introduced into or removed from Glauber's salt, movement of the heat transfer surface relative to the solution is of no advantage. The problem with respect to macro-segregation still occurred in the Hodgins et al. apparatus (p. 298). It is reported therein that crystallization occurred at the bottom of the container for the salt solution. A layer of hydrated crystals formed an impervious barrier over a layer of the anhydrous salt, thereby preventing the anhydrous salt so crystallized from entering into the requisite hydration reaction. This isolation of the anhydrous layer from the solution prevents dissolution of the anhydrous material, which must precede crystallization of additional $Na_2SO_4 \cdot 10H_2O$, thereby limiting in practice the amount of latent heat that is available in theory.

In a Letter to the Editor (The Sun at Work, Vol. 2, p. 2, June 1957) A. Whillier makes reference to the work by Hodgin et al. and proposes to overcome the problem of stratification by providing for continuously mechanically inverting containers of salts possessing noncongruent melting points. The arrangement proposed for accomplishing this is to "mount the chemical containers on a wheel which would be rotated slowly during the cooling cycle". Thus, if the containers were sealed and fixed in place, each container on the rotating wheel would periodically be turned upside down and then right side up.

On page 4 of the article "Solar-Heat Storage" by Maria Telkes (ASME Paper 64 WA-SOL-9) reference is made to the work by Hodgins et al. and to Whillier correspondence with the comment that "Such mixing, stirring or agitating is highly impractical, especially in sealed containers ...". The author proceeds to describe a mechanism to prevent the settling of the anhydrous salt; namely, the mixing of thickeners with the salt hydrate to change it into a gel upon melting.

The instant invention has particular application to overcoming the long existing problem in utilizing Glauber's salt and similar incongruently melting hydrate systems, and also to the provision of apparatus and the method for economically and effectively providing for heat transfer into and out of liquid-solid phase change materials in general.

DESCRIPTION OF THE INVENTION

A heat exchange device for the introduction of thermal energy into and removal of thermal energy from liquid-solid phase change material is described in which the phase change material is maintained in a container, which is slowly rotated about a generally horizontal axis at a substantially constant rotational speed to impart interparticle motion to crystallized material when present. Means are provided for automatically nucleating the phase change material as required for cyclic operation. The invention is of particular utility in the use of incongruently melting hydrates for the storage of thermal energy.

BREIF DESCRIPTION OF THE DRAWING

The subject matter of the instant invention for which protection is sought is presented as claims at the conclusion of the written description of the invention as set forth herein. The description sets forth the manner and process of making and using the invention and the accompanying drawing forms part of the description for schematically illustrating the best mode.

The view shown in FIG. 1 sets forth the pertinent parts of the sodium sulfate-water phase diagram;

FIGS. 10 and 11 are presented to show functional, rather than spatial, relationships.

MANNER AND PROCESS OF MAKING AND USING THE INVENTION

The apparatus and method of the instant invention are broadly applicable to the conduct of the heat transfer (in and out) and heat storage functions with liquid-solid phase change materials in general (e.g., inorganic salt hydrates, simple organic compounds, inorganic anhydrous salts, metals and alloys).

In accomplishing TES by phase change, a material is changed from a low heat content phase to a high heat content phase at a constant temperature accompanied by absorption of the heat of transformation. The most practical application of this phenomenon is the use of the solid-liquid transition.

Figure 1:
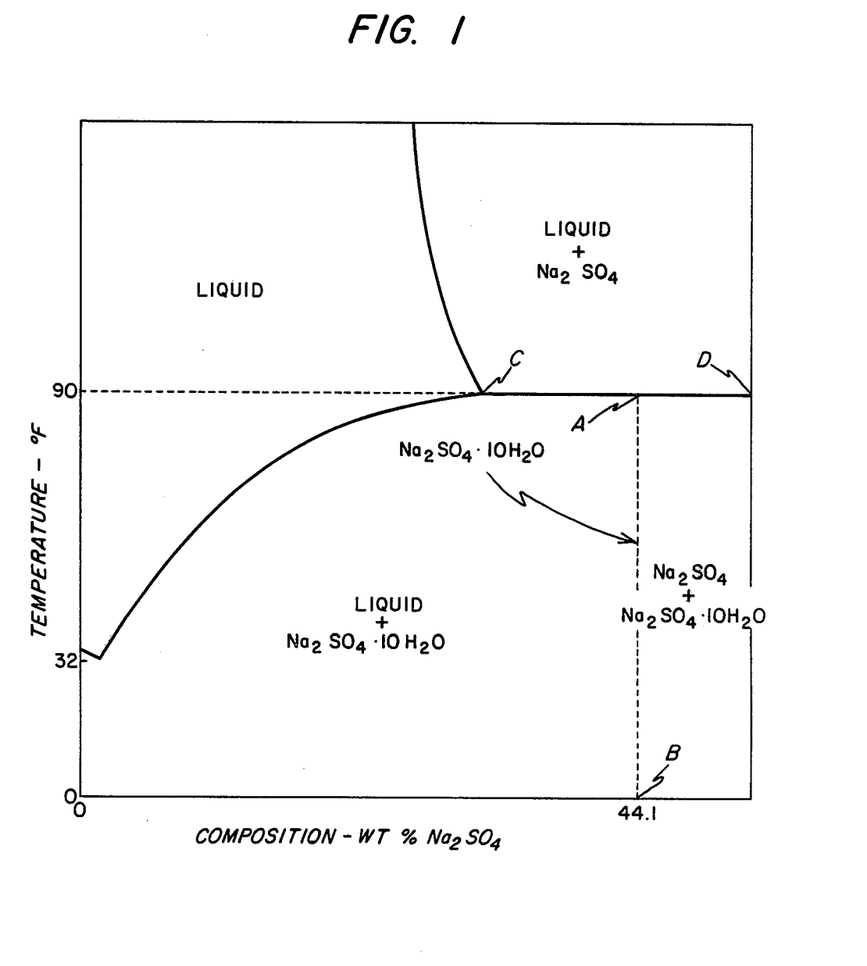

In the case of Glauber's salt [indicated on the phase diagram (FIG. 1) as $Na_2SO_4 \cdot 10H_2O$] the phase change yielding the greatest amount of heat occurs when the heating and cooling operations are conducted so as to cross line CD sequentially up and down at or adjacent point A. Efforts to carry on these operations in the past have been unsuccessful due to the incongruent melting characteristics of this material.

Figures 2, 5:
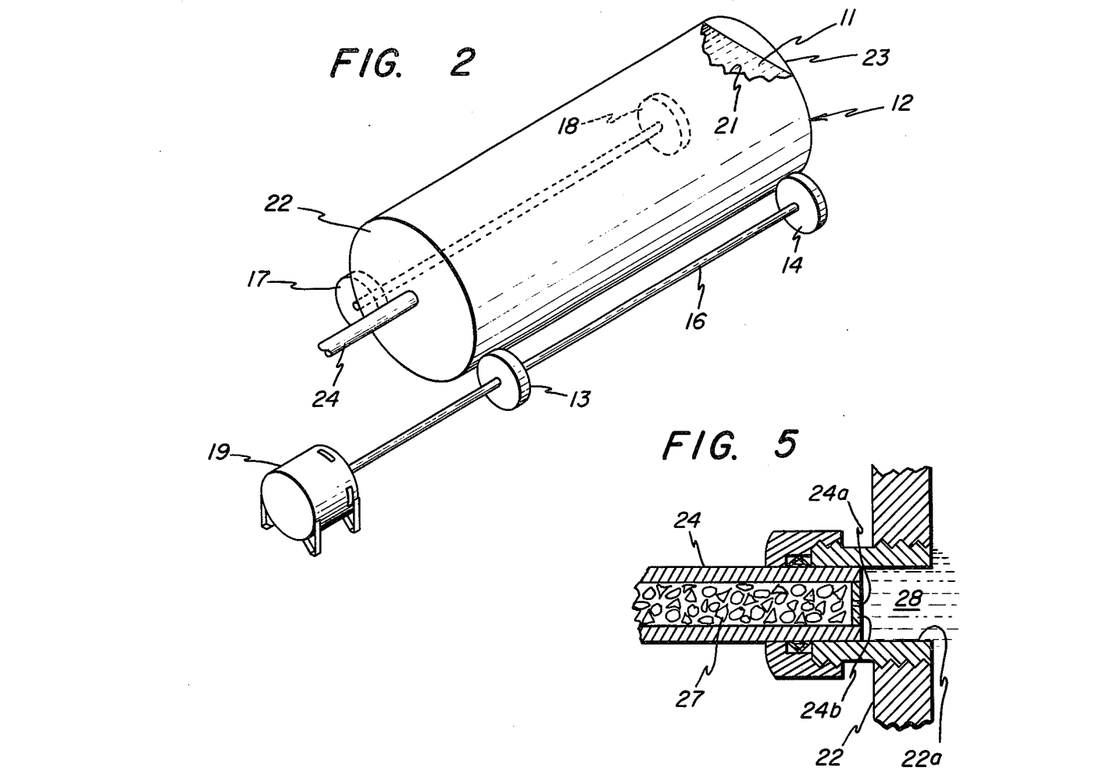
FIGS. 2 schematically illustrates in three-dimensions a heat exchange device according to the instant invention.
FIG. 5 is an enlarged sectional view of a liquid-tight, gas-tight juncture between such a nucleating device and the end wall of the heat exchange device

The apparatus of this invention for the first time makes possible the long term cyclic heating and cooling operations desired with this difficult phase change material, not only eliminating the disadvantageous consequences of incongruent performance during melting, but also insuring remarkably effective heat exchange during the entire cycle at an unusual high rate without the attachment of crystallized hydrate on the heat exchange surface such as to create a layer. These beneficial results are obtained with apparatus such as is shown in FIG. 2.

The liquid-solid phase change material 11 is contained within closed liquid-tight enclosure 12 mounted with the central axis thereof in the generally horizontal direction and supported on rotatable means by which a driving force can be applied to rotate enclosure 12 about its central axis. As shown, enclosure 12 is supported on driven rollers 13, 14 connected by shaft 16 and a set of idler rollers 17, 18 similarly connected by a shaft. Restraining or positioning means for the roller system are not shown. Driving power for rollers 13, 14 is supplied by motor 19, either directly or through a speed reducer (not shown). Preferably, the entire outer shell (cylinder 21 and ends 22 and 23) are made of a material, e.g., metal, glass, ceramic, etc. whereby all of these surfaces can function as efficient heat exchange surfaces. If desired, the inner surface of the shell may be covered with a different material in order to provide surface characteristics desirable for the particular phase change material employed.

Heat exchange is effectuated by bringing fluid into contact with the outer surfaces of enclosure 12 in the general manner described hereinbelow. One of the problems encountered in thermally cycling liquid-solid phase change materials from the melted condition to the solidified condition is supercooling. Liquids in their chemically pure state must be supercooled well below the liquid-solid transition temperature to initiate solid crystal lattice formation in the absence of some mechanism to promote nucleation. Supercooling is undesirable, because it reduces the recoverable heat release thereby introducing a thermodynamic inefficiency.

It is known to introduce small quantities of chemical nucleating agents into hydrates, however, such nucleating agents are frequently not reliable over the long term in that deterioration of the effectiveness thereof occurs with repeated freeze-thaw cycling or overheating.

A simple inexpensive solution to the provision of long term reliable nucleation is the use of hollow tube 24 (shown in FIG. 2 as being of indefinite length). The tube is a receptacle for providing the permanent availability of solid (crystalline) material capable of initiating the formation of crystals in the liquified phase change material, when in contact with such material. Tube 24, which may be made of plastic (e.g., polypropylene) or metal (e.g., stainless steel), is closed at the distal end thereof and the interior of this tube is in flow communication with the interior of enclosure 12, preferably through a restricted opening 24a through thin plug 24b. Usually, the nucleating material will be crystals of the phase change material and, as long as the phase change material in the enclosure is in the liquid state, these crystals will be in contact therewith. When the temperature conditions are appropriate for solidification of the phase change material in the enclosure, crystal growth will proceed along the length of tube 24 and enter the enclosure 12 for the initiation of nucleation therein.

In order to maintain the nucleation material in the distal end of tube 24 in the solid state and always ready to propagate the crystal lattice throughout the length of the tube and throughout the entire volume of the enclosure when the temperature conditions have dropped below the melting point, the distal end of tube 24 must be maintained in a suitable thermal environment, i.e., a temperature below the melting point of the nucleation material.

It is most desirable, of course, to provide that when the temperature of the volume of material in the enclosure (and, thereby, in tube 24) falls below the melting point of the nucleation material, the crystal growth will proceed along tube 24 and make contact with the liquid phase change material 28 in enclosure 12 in a reasonably short period of time (i.e., equal to or less than the changeover time from heating cycle to cooling cycle). In the case of a nucleator tube about 3 feet long it is preferable that the velocity of crystal growth along the tube be about 6 feet/hour or greater. This performance should be reliably reproducible time after time.

Satisfactory crystal growth velocities are obtained by the presence along the inside of the nucleator tube of solid surfaces having surface defects such as will create crystal defects in the advancing front of crystal growth as these surfaces are encountered thereby. The linear growth rates for the growth of the dislocation imperfect crystals resulting from collisions and interactions with such surfaces is many times greater than the growth rates for growth on the faces of the same crystals free of major defects (i.e., as much as 50,000 times greater).

The requisite solid surfaces can be readily provided in a two-component (e.g., water and $Na_2SO_4$) liquid-solid phase change system by employing a solid component in granular form substantially in excess of stoichiometric requirements in the preparation of the nucleator tube so as to insure survival of a large population of the granules. These granules provide the requisite solid surfaces. A method for preparing a nucleator tube for rapid crystal growth therealong for a liquid-solid phase change system employing Glauber's salt is set forth hereinafter in describing the best mode for practicing this invention.

Of course, in those instances in which long term reliability is not important and/or overheating is not encountered chemical nucleating agents may be employed (e.g., borax in Glauber's salt).

Figure 3:
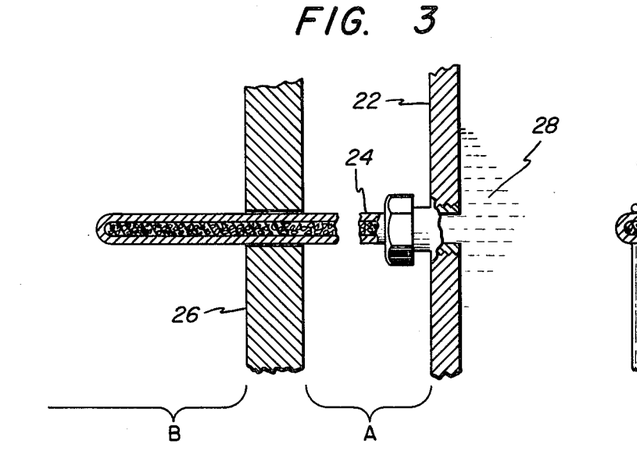
FIG. 3 is an enlarged view of a partion of FIG. 2 to show the details of one embodiment of an automatic nucleating device.
Figure 4:
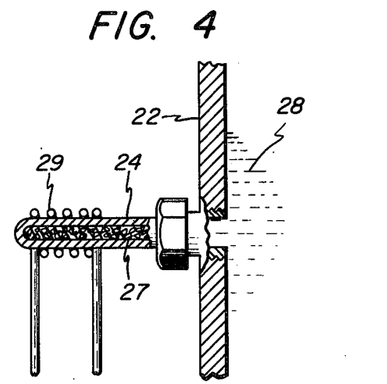
FIG. 4 is a view similar to FIG. 3 showing a second embodiment of a nucleating device.

FIGS. 3, 4 and 5 disclose structure by which the distal end of the nucleation tube may be maintained in a suitable thermal environment and the tube is attached to the end wall of enclosure 12. In the arrangement shown in FIG. 3 tube 24 extends through region A in which the enclosure is housed through insulating wall 26 and into region B, which is at a temperature below the melting point of the crystals of liquid-solid phase change material, which are in contact with liquid phase change material 28 through the interstices between the surviving granules 27 of solid component providing for the desired rapid crystal growth as described above. In the arrangement shown in FIG. 4 the distal end of tube 24 is subject to the cooling environment created by refrigeration coil 29 connected to a vapor compression refrigeration system (not shown). In both instances the cross-hatched portion of the length of the interior of tube 24 represents the length of tube 24 in which the interstices between granules 27 are occupied by crystalline liquid-solid phase change material, because the temperature in this region of tube 24 is kept below the melting point of the phase change material. Although not shown herein, nucleation may also be controllably initiated by mounting a piezoelectric crystal on the enclosure where it may be utilized to apply an ultrasonic field to a portion of the liquid, controls (now shown) being supplied to activate the piezoelectric crystal in a temperature dependent manner.

Rotation of the heat transfer container, or enclosure, is to be accomplished at a preselected constant slow speed. Both the maximum and minimum rotational speeds to be employed address themselves to the maintenance of highly effective heat transfer to and through the inside surface of the wall of the container. Thus, the rotational speed must be less than the rotational speed at which, during the phase change from liquid to solid, crystals forming at the inside surface of this wall do not fall away from this surface under the influence of gravity during the transport of these crystals in an ascending path as the container is rotated. The minimum speed is related to the particular phase change material in that the time required for any point on the surface of the cylinder to be moved about one half of a complete revolution must be less than the time required for adjacent crystals deposited from the phase change material to become bonded together. In the case of Glauber's salt, Glauber's salt crystals act as a bonding medium between adjacent anhydrous sodium sulfate crystals, a condition to be avoided. For example, experiments conducted with a six-inch inside diameter (ID) rolling cylinder 95% full of Glauber's salt were successfully conducted at 3 RPM through a very large number of sequential freeze-thaw cycles without any evidence of degraded reversability. In systems employing Glauber's salt rotational speeds are preferably in the range 1–10 RPM.

Both the maximum and minimum rotational speeds can be determined with the guidelines set forth hereinabove by routine experimentation.

Figure 6:
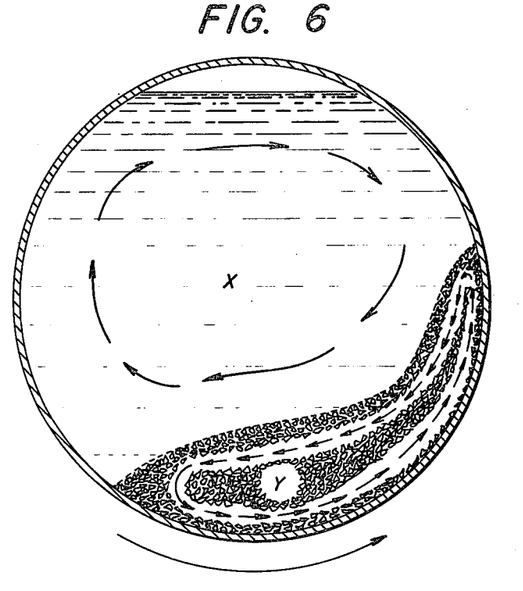
FIG. 6, 7 and 8 are views showing in progression the condition of a Glauber's salt system contained in the device of FIG. 2 proceeding from the melted condition to the 90% solidified condition.
Figure 7:
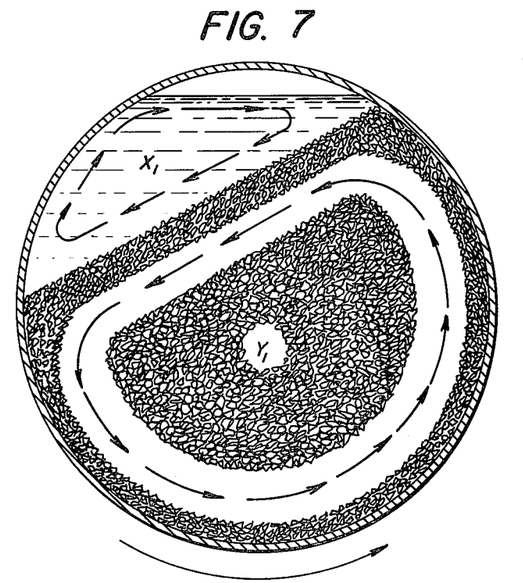
Figure 8:
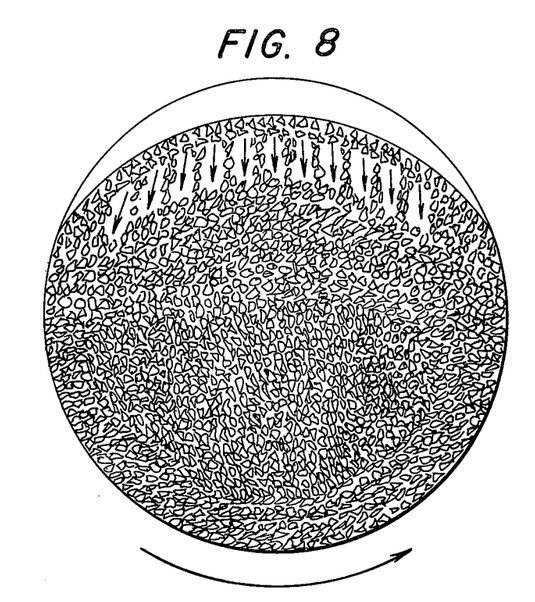

Experiments have been successfully conducted with containers having the cylindrical wall made of both metal and glass. In order to observe the patterns of flow during the melt-thaw cycles both ends of the container were made of a transparent material. The conditions shown in FIGS. 6, 7 and 8 are representative of conditions observed upon initiation and conduct of the freeze cycle in Glauber's salt. Minor secondary liquid flow patterns at the cylindrical wall have not been shown as they are not considered necessary for the illustration of this invention.

Figure 9:
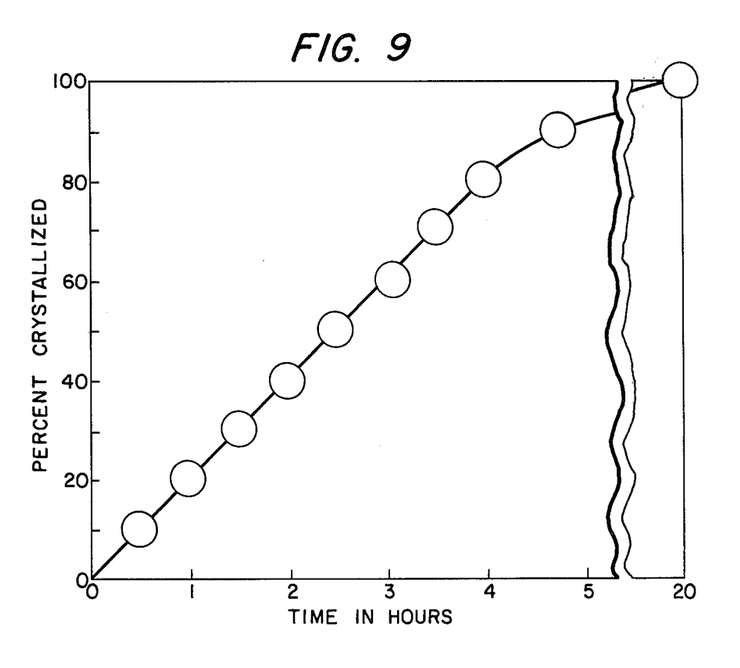
FIG. 9 is a view establishing the rate of heat removal (BTU/hr/sq. ft.) obtained using Glauber's salt in the heat exchange device of this invention.

FIG. 6 illustrates the internal motions of liquid (region X) and gradually forming solid (region Y) with liquid in the interstices. Excellent heat transfer is maintained through the cylinder wall to the Glauber's salt without decrease of the heat transfer coefficient until about 90% crystallization has occurred. Thereafter as crystallization continues a marked decrease in heat traansfer coefficient is experienced. This is illustrated by the change in slope in FIG. 9.

FIG. 7 illustrates the internal motions observed, when about one half of the Glauber's salt had crystallized. The region of liquid (region $X_1$) had diminished considerably and the region occupied by solid crystal with liquid in the interstices (region $Y_1$) had increased considerably. Throughout the entire freeze cycle crystals being formed on the inside of the cylinder wall inevitably fall away from the wall at some point during the ascending portion of the rotation. This is indicated by the flow pattern (arrows) in region $Y_1$. The falling away of the crystals of solid phase change material from the wall of the enclosure early in the ascending portion of the rotational cycle is highly desirable, thus, the greater the difference in density between the crystalline state and the liquid state, the sooner this falling away of newly-formed crystals will occur and the better the operation of the system. In the vast majority of known liquid-solid phase change materials, the crystalline state is more dense than the liquid state.

As is seen in FIG. 8 considerable internal relative motion between crystals persists even after the Glauber's salt is about 90% solidified. As noted hereinabove except in very small diameter systems the heat and mass transfer coefficients remain at a very high level. The graph of FIG. 9 displays the percent crystallization of the Glauber'salt occurring as a function of time. The linear nature of most (~90%) of the curve further establishes the excellent heat transfer to the enclosure wall from the thermally uniform contents of the enclosure and the lack of accumulation of a layer of solids on the enclosure wall.

The calculated work of rotation for an operating system shows that less than one-half horsepower need be expended to provide the requisite rotation for a one million BTU storage container (i.e., 800 gallons).

Figure 10:
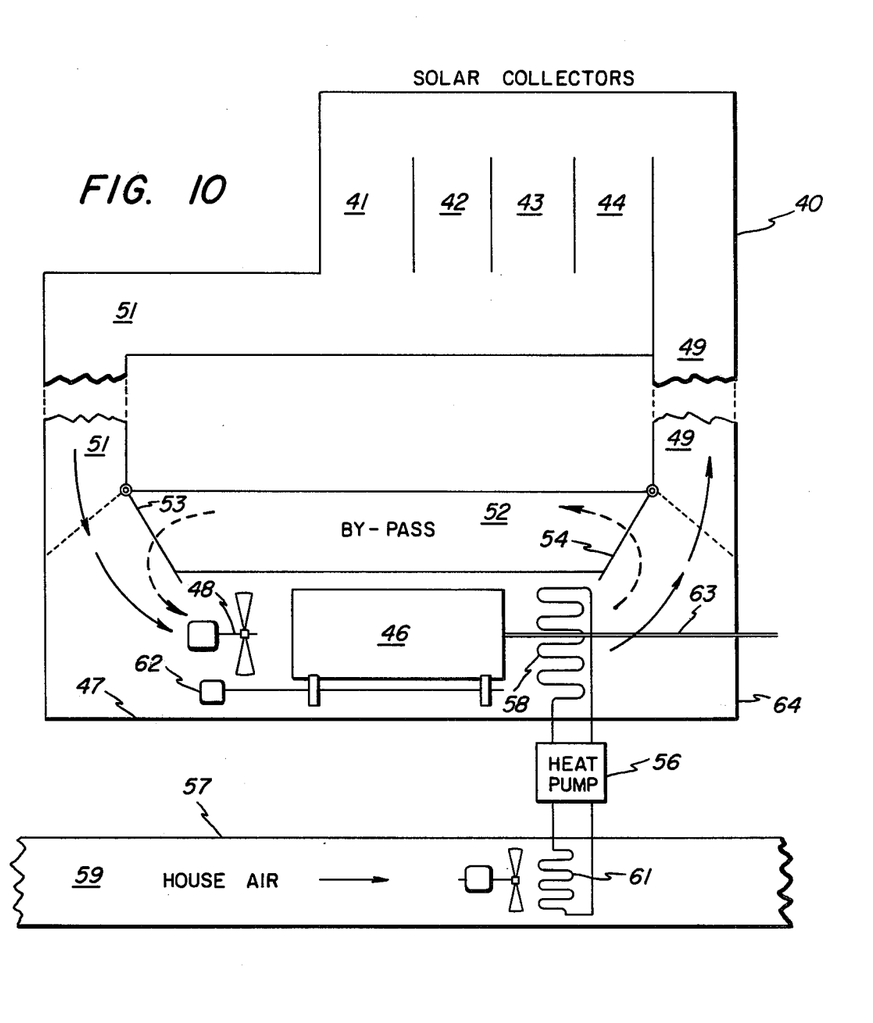
FIG. 10 is a schematic illustration of an air circuit heating-cooling system employing the instant invention.
Figure 11:
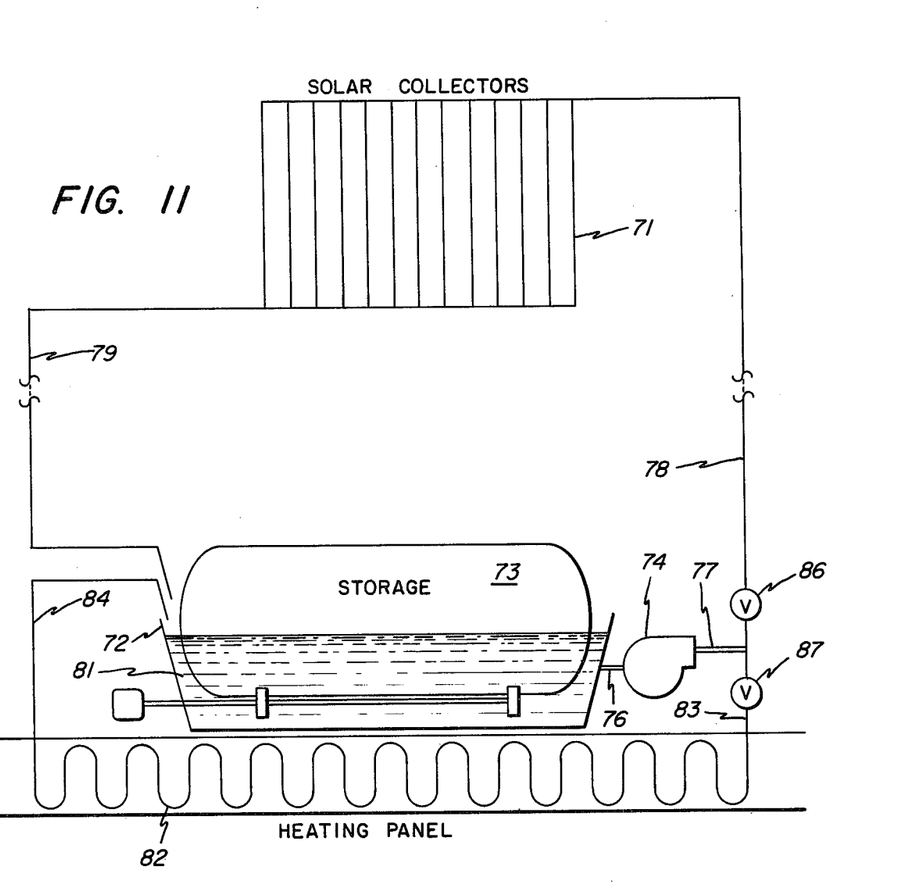
FIG. 11 is a liquid circuit panel heating system employing the instant invention.

The mode of incorporation of the heat exchange device into residential applications is illustrated in the systems set forth in FIGS. 10 and 11. Enclosure 40 incorporates solar collection means (i.e., solar panels 41, 42, 43, 44) for the accumulation of thermal energy and, for example, may be mounted on the roof of the residence. Thermal energy storage means (i.e. the rotating heat exchange device 46 of this invention) are shown disposed in conduit 47 located, for example, in the basement of the residence. Air moved by fan 48 can be controllably brought into contact with the heat exchange surfaces of device 46 via ducts 49, 51 whereby conduit 47 is placed into flow communication with the solar collectors 41–44 in a circuitous path. Bypass conduit 52 is arranged to be selectively placed into flow communication with conduit 47 by means of damper valves 53, 54. These dampers selectively place conduit 51 in flow communication with conduit 47 and at the same time place conduits 49 and 51 out of flow communication with conduit 47. Heat pump 56 has a coil in conduit 47 for interchanging thermal energy between conduit 47 and residence 57.

Such an air circuit system may be employed both for heating and for cooling residence 57. In operation in the heating mode, during sunny days fan 48 circulates air over the surface of container 46, past heat pump expansion coils 58, into duct 49 (dampers 53 and 54 being disposed so as to shut off bypass 52), through the solar collectors (where the circulating air picks up heat), along duct 51 and back to conduit 47. This arrangement prevails during the portion of the day when thermal energy can be accumulated and stored in container 46 by changing the phase change material from the solid to the liquid state. At the same time coils 58 of heat pump 56 receive heat and, if the house air circulating through duct 59 requires heating, the heat pump will be automatically turned on by the residential thermostat thereby providing heat at the condenser coils 61 in order to heat the house air circulated through duct 59.

Assuming that thermal energy has been stored in container 46, when solar heat is unavailable (i.e. at night and on cloudy days) dampers 53, 54 are reset so as to close off communication between duct 47 and ducts 49 and 51 thereby establishing interconnection between bypass 52 and conduit 47. In this arrangement for circulating air, fan 48 directs the air over the surface of container 46 being slowly rotated by motor 62 and the roller system driven thereby to receive heat therefrom. The air so heated passes over coils 58 and returns to fan 48 via bypass 52. In this manner heat pump 57 will receive the stored thermal energy and make this energy available in the resistance via condenser coils 61. During this period of operation the phase change material in container 46 will be changing to the solid state. Nucleation is automatically provided via nucleation tube 63, the distal end of which is disposed outisde of conduit 47 separated therefrom by insulating wall 64 in a thermal environment insuring that some of the phase change material crystals located within nucleation tube 63 will remain in the solid condition always ready to propagate the crystal lattice throughout the length of the tube toward and into the rolling cylinder 46, when the temperature of the content thereof drops below the melting point for the phase change material.

In the cooling sequence of operation in which residence 56 is airconditioned, heat is removed from the house air flowing through duct 59 and introduced via condenser coil 58 into the appropriate air circuit for disposal. Thus, during day operation when the temperature is above some predetermined value, the bypass circuit is employed. By moving air within the bypass 52/conduit 47 circuit, heat from coil 58 is introduced into rotating cylinder 46 for ultimate removal therefrom, when the appropriate temperature conditions prevail out-of-doors. The damper valves 53, 54 are two-position valves and are either in the position to close off bypass 52 or in the position to open the bypass and close off ducts 51, 49, respectively. The movement may be manually effectuated or, if desired, positioning may be accomplished by a motorized system (not shown) responsive to some thermal sensor (not shown) disposed, for example, in the region of the solar collectors.

When outside temperature conditions have been reduced to some preselected value, the air circuit via the solar collectors is brought into operation and the circulating air transfers heat from the thermal energy storage device 46 to the region of the collectors (e.g. at night), when the air is cooled.

A similar arrangement utilizing circulating water or other liquid in a heating system is set forth in FIG. 11. Water circulated through solar collectors 71 picks up heat and is returned to tank 72 wherein is disposed the partially immersed thermal energy storage device 73 and means for effectuating the constant slow rotation thereof. Circulation of the fluid is effectuated by pump 74 via pipes 76, 77, 78 and 79. This same pump provides circulation of the heated water 81 through the coil in heating panel 82 (e.g. disposed in the floors, walls or ceilings of the residence) via supply pipe 83. Cooled water is returned via pipe 84. Automatic operation will require a solar energy sensor (not shown) arranged to actuate valve 86 as required and a thermostat (not shown) arranged to actuate valve 87 as required. A logic circuit (not shown) should be employed to turn on pump 74 when either of these valves is open.

Although the heat exchange device of this invention is particularly suited to overcoming the problems encountered when utilizing an incongruently melting hydrate as the liquid-solid phase change material, and, as will be described hereinbelow, for heating in the 90°–150° F. range particularly suitable to the heating of residences, the invention is not so limited. When the proper liquid-solid phase change material has been selected, TES may be usefully applied in any of the various situations listed below with the appropriate temperature ranges therefor:

| | |
|---|---|
| 40°–60° F. | Air conditioning |
| 30°–70° F. | Heat pump (evaporator-side) |
| 90°–150° F. | Residential heating |
| 110°–150° F. | Heat pump (condenser-side) |
| 150°–300° F. | Commercial heat (e.g. hot water heating; steam generation) |
| 150°–600° F. | Industrial heating (high pressure steam generation, e.g., 800 psi) |
| 500°–1,000° F. | Utility generation of electric power (boiling water reactor). |

BEST MODE CONTEMPLATED

For residential heating and cooling systems the best mode contemplated for the TES of this invention is a container in a generally right cylindrical configuration with ends dished elliptically outward having a capacity of about 800 gallons with this volume about 95% occupied by Glauber's salt as the liquid-solid phase change material. When Glauber's salt is used the constant rotational speed for the unit about its horizontal axis would be at the rate of about 3 RPM. The drive is preferably a one-quarter horsepower motor applying its power via reduction gearing. The tank wall is preferably of a ferric composition and may contain a rust inhibitor to scavenge the oxygen that may enter the unit before sealing has been accomplished. If the tank is plastic- or glass-lined, the rust inhibitor need not be employed. The rate of heat removal capability is in excess of 50/BTU/hr/sq. ft.

Permanent nucleation capability is provided by means of a stainless steel nucleation tube connected approximately at the center of one end 22 of the tank 12 via a fitting as shown in FIG. 5. The interior of the tank is in flow communication with the interior of the tube via small opening 24a through thin copper plug 24b. The outer sealed end of the tube is maintained in a thermal climate which is always below 90.3° F., the melting point of Glauber's salt.

In order to optimize the speed with which crystal growth will proceed along tube 24 to opening 24a and then to the liquid phase change material 28 in hold 22a, the nucleation tube content is provided as follows:

1. the tube and the material to be disposed therein are to be at temperatures in the range of from greater than 90.3° F. to less than 100° F;
2. the tube is filled with water (e.g., at a temperature of 95° F.);
3. granular $Na_2SO_4$ crystals (assorted particle sizes) are added to fill the tube, sufficient of the $Na_2SO_4$ dissolves in the water to fill the interstices between the solid $Na_2SO_4$ granules with a saturated solution of $Na_2SO_4$ in water.
4. the tube and contents is cooled to drop the temperature thereof below 90.3° F. whereby crystals of Glauber's salt form in the saturated solution;
5. copper plug 24b is forced into the open end of tube 24 to retain the solid $Na_2SO_4$ granules therein;

(At this point, if desired, a cover can be placed over the end of tube 24 having opening 24a and the prepared nucleator can be stored at a temperature of less than 90.3° F.)

6. attached to wall 22 (e.g., as shown in FIG. 5); and
7. the distal end of tube 24 is maintained at a temperature below 90.3° F.

What I claim as new and desire to secure by Letters Patent of the United States is:

1. A heat exchange device for introducing thermal energy into and retrieving thermal energy from liquid-solid phase change material in which the solid phase of said phase change material is more dense than the liquid phase of said phase change material thereby enabling thermal energy storage comprising in combination:

a closed liquid-tight enclosure mounted with an axis thereof extending in the generally horizontal direction, the major portion of the wall area of said enclosure serving as heat exchange surface, the heat exchange surface wall area being symmetrically disposed around said axis;

means for rotating said enclosure around said axis and means affixed to said enclosure for predetermining the initiation of the formation of crystals of liquid-solid phase change material whereby the extent of supercooling of phase change material disposed within said enclosure in the liquid state can be controlled.

2. The heat exchange device recited in claim 1 wherein the means for predetermining the initiation of crystal formation is a hollow tubular projection affixed at one end to the enclosure, said one end having an opening therein and the interior of said tubular projection being in communication with the interior of said enclosure and the distal end of said tubular projection being closed.

3. The heat exchange device recited in claim 2 wherein the tubular projection has disposed adjacent thereto means for preventing temperature rise within said tubular projection above a set temperature.

4. The heat exchange device recited in claim 3 wherein the preventing means is a thermal barrier.

5. The heat exchange device recited in claim 3 wherein the preventing means is a refrigeration coil.

6. The heat exchange device recited in claim 1 wherein the enclosure is in the shape of a surface of revolution around the axis.

7. The heat exchange device recited in claim 6 wherein the enclosure is in the shape of a right circular cylinder with ends dished elliptically outward.

8. In a thermal energy storage system in which means are provided for the exchange of heat between liquid-solid phase change material contained within a container and a fluid stream maintained separate from said phase-change material, the solid phase of said phase change material being more dense than the liquid phase of said phase change material and means connected to said heat exchange means are provided for moving said heat exchange means, the improvement comprising:

said container being a closed liquid-tight enclosure mounted with an axis thereof extending in the generally horizontal direction, the major portion of the wall area of said enclosure serving as said means for heat exchange, the heat exchange wall area being symmetrically disposed around said axis and said moving means being means for rotating said enclosure around said axis.

9. The improvement recited in claim 8 including in addition means affixed to said enclosure for predetermining the initiation of the formation of crystals in phase change material in the liquid state disposed within said enclosure.

10. The improvement recited in claim 9 wherein means for predetermining the initiation of the crystal formation is a hollow tubular projection containing crystalline phase change material affixed at one end to the enclosure, said one end being open and the interior of said tubular projection being in communication with the interior of said enclosure and the distal end of said tubular projection being closed.

11. The improvement recited in claim 10 wherein the tubular projection has disposed adjacent thereto means for preventing temperature rise in said projection above a set temperature whereby at least some of the phase change material therein is maintained in the crystalline state.

12. The improvement recited in claim 11 wherein the preventing means is a thermal barrier.

13. The improvement recited in claim 11 wherein the preventing means is a refrigeration coil.

14. The improvement recited in claim 8 wherein the means provided for the exchange of heat includes a duct containing the enclosure and a fan unit for moving air over the outer surface of the enclosure and the thermal energy storage system also includes means for selectively placing said duct into flow communication at each end thereof with heating means for said air and placing said duct into flow communication at each end thereof with a by-pass duct.

15. The improvement recited in claim 8 wherein the means provided for the exchange of heat includes a pump and first conduits for circulating liquid in a circuit by which heated liquid is brought into contact with the outer surface of the enclosure and is returned to a source of heat therefor and second conduits by which liquid heated by contact with the outer surface of said enclosure is circulated to and from a heat demand volume.

16. In the method of storing thermal energy in and retrieveing thermal energy from a liquid-solid phase change material, the solid phase of said phase change material being more dense than the liquid phase of said phase change material, wherein said phase change material is maintained in a container and fluid is circulated over the outer surface of said container to effectuate the desired heat exchange, the improvement comprising the steps of:

rotating said container at a preselected constant rotational speed about a generally horizontal axis, said rotational speed being less than the rotational speed at which, during the phase change from liquid to solid, solid formed at the inside surface of the wall of said container does not fall away from said surface under the influence of gravity during carriage thereof in an ascending path.

17. The improved method recited in claim 16 wherein heat is removed from the rotating container at the rate of about 50 BTU/hr/sq. ft.

18. The improved method recited in claim 16 wherein the speed of rotation is in the range of from 1 to 10 revolutions per minute.

19. The improved method recited in claim 16 wherein the liquid-solid phase change material is an incongruently melting hydrate.

20. The improved method recited in claim 19 wherein the hydrate is $Na_2SO_4 \cdot 10H_2O$.

21. The improved method recited in claim 16 wherein nucleation of crystals of the solid phase is automatically provided during the phase change from liquid to solid.

22. The improved method recited in claim 21 wherein the solid form of the liquid-solid phase change material is $Na_2SO_4 \cdot 10H_2O$ and the speed of the automatic nucleation thereof is increased by providing solid $Na_2SO_4$ granules in at least part of the path of the developing crystals of $Na_2SO_4 \cdot 10H_2O$.

23. The improved method recited in claim 22 wherein the path of the developing crystals is in an overall predominately linear direction.

24. The improved method recited in claim 20 wherein the nucleation is accomplished with solid crystalline material of the same composition as the phase change material.

25. The improved method recited in claim 21 wherein the solid crystalline material is kept at a temperature below the transition temperature.

26. The improved method recited in claim 16 wherein the container is continuously rotated.

* * * * *